United States Patent [19]
Hou

[11] Patent Number: 6,092,347
[45] Date of Patent: Jul. 25, 2000

[54] SKELETON OF A GREENHOUSE

[76] Inventor: Chung-Chu Hou, P.O. Box, 82-144, Taipei, Taiwan

[21] Appl. No.: 09/132,264

[22] Filed: Aug. 11, 1998

[51] Int. Cl.[7] .................................................. E04H 12/00
[52] U.S. Cl. ........................ 52/648.1; 52/650.1; 52/650.2; 52/653.1; 52/302.1
[58] Field of Search ............................... 52/648.1, 650.1, 52/650.2, 650.3, 653.1, 712, 11, 302.1

[56] References Cited

U.S. PATENT DOCUMENTS

| | | | |
|---|---|---|---|
| 2,386,019 | 10/1945 | Watter | 52/650.1 X |
| 3,948,012 | 4/1976 | Papayoti | 52/650.1 X |
| 5,050,358 | 9/1991 | Vladislavic | 52/653.1 X |
| 5,289,665 | 3/1994 | Higgins | 52/648.1 X |
| 5,802,772 | 9/1998 | Burke et al. | 52/650.3 X |

*Primary Examiner*—Carl D. Friedman
*Assistant Examiner*—Phi Dieu Tran A
*Attorney, Agent, or Firm*—A & J

[57] ABSTRACT

A skeleton of a greenhouse includes a plurality of equidistant posts, a plurality of beams each fixedly mounted between every two of the posts, a plurality of bracing struts each having a lower end welded with an L-shaped fixing member, a plurality of drain pipes each fixedly mounted between every two of the L-shaped fixing members, and a plurality of vertical rods each having a lower end welded with an inverted U-shaped member fitted with a respective one of the drain pipes and fixed in place by bolts, whereby the skeleton of a greenhouse can be rapidly and easily built in a short time.

3 Claims, 5 Drawing Sheets

SKELETON OF A GREENHOUSE

BACKGROUND OF THE INVENTION

1. Field of the Invention

This invention is related to a skeleton of a greenhouse and in particular to one which can be easily and rapidly built.

2. Description of the Prior Art

The greenhouse is an enclosed glass house used for growing plants, in regulated temperatures, humidity, and ventilation. Greenhouses have long been used for holding plants over cold seasons and to some extent for growing tropical plants and hothouse fruit. However, it is time-consuming and very inconvenient to arrange a drain pipe in the conventional greenhouse.

Therefore, it is an object of the present invention to provide an improved skeleton of a greenhouse which can obviate and mitigate the above-mentioned drawback.

SUMMARY OF THE INVENTION

This invention is related to an improved skeleton of a greenhouse.

It is the primary object of the present invention to provide a skeleton of a greenhouse which can be easily and rapidly built.

It is another object of the present invention to provide a skeleton of a greenhouse which is simple in construction.

It is still another object of the present invention to provide a skeleton of a greenhouse which is low in cost.

It is still another object of the present invention to provide a skeleton of a greenhouse which is fit for practical use.

It is a further object of the present invention to provide a skeleton of a greenhouse which is sturdy in construction.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
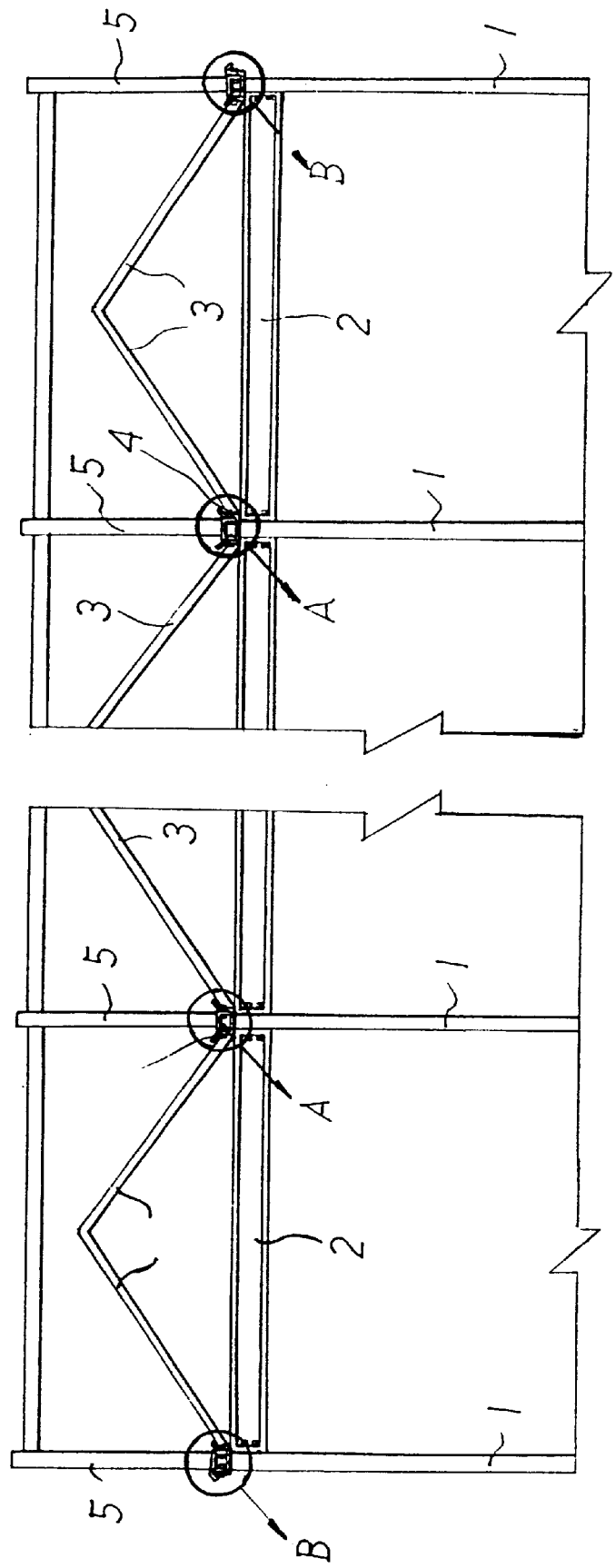
FIG. 1 is a front view of a skeleton of a greenhouse according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the skeleton of a greenhouse according to the present invention generally comprises a plurality of equidistant posts 1, a plurality of beams 2, a plurality of bracing struts 3, a plurality of drain pipes 4 and a plurality of vertical rods 5.

Figure 2:
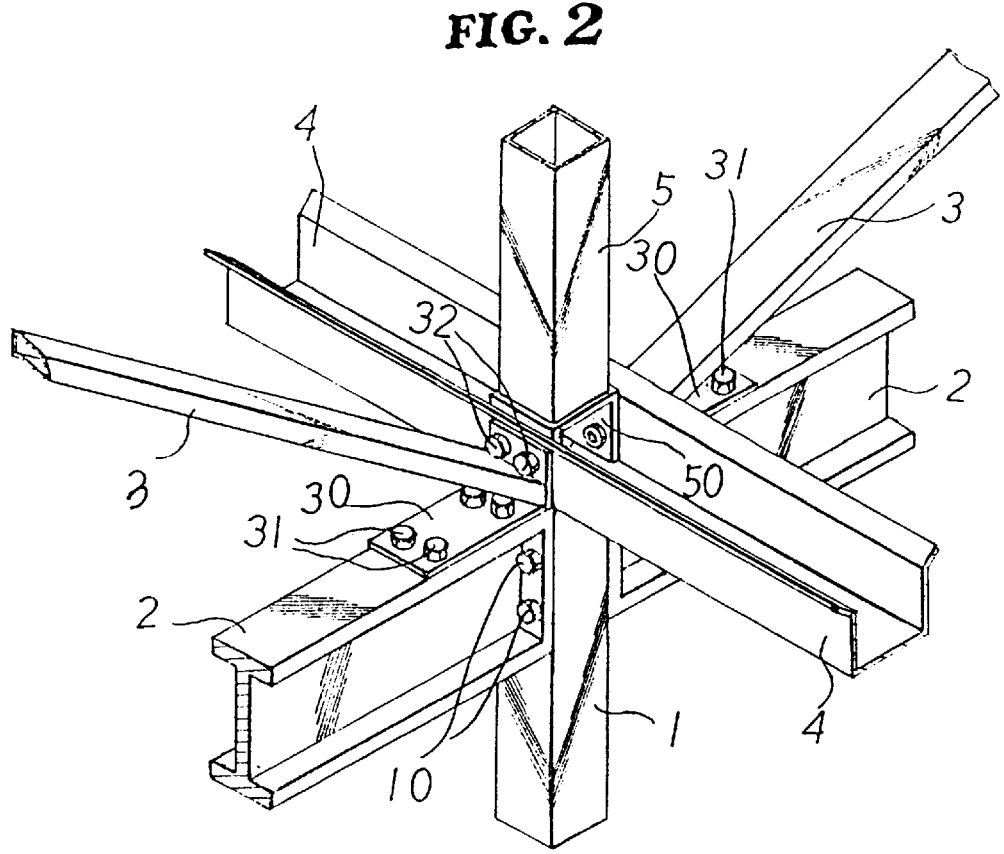
FIG. 2 is a perspective view illustrating the structure of the present invention.
Figure 3:
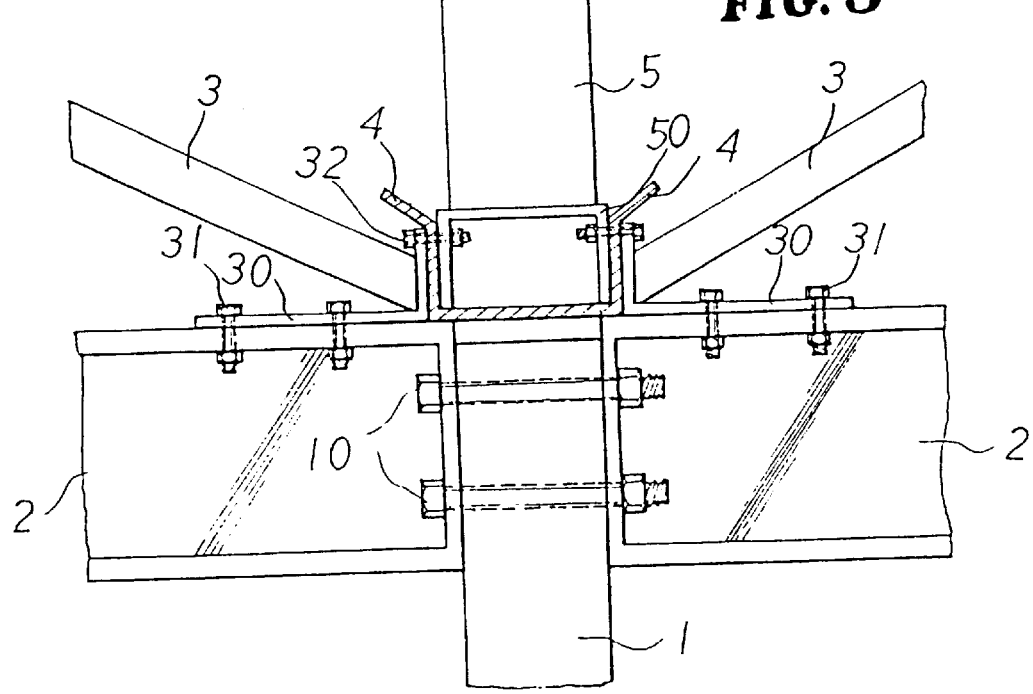
FIG. 3 is a sectional view illustrating the structure of the present invention.

Referring to FIGS. 2 and 3 thereof, the post 1 is fixedly mounted between two beams 2. The beam 2, bracing strut 3 and vertical rod 5 may have a cross section with (the shape of "I", "⊔" or a rectangle as required. The drain pipe 4 which has a cross section of "⊐⊔" is arranged on the upper end of the post 1. A L-shaped fixing member 30 is fastened on the lower end of the bracing strut 3 by welding. The horizontal portion of the L-shaped fixing member 30 is fixedly mounted on the beam 2 by bolts 31. An inverted U-shaped member 50 is joined to the lower end of the post 5 by welding. The upper end of the post 5 is designed for supporting a shielding cover (not shown). The vertical portion of the L-shaped fixing member 30 is fastened on a lateral side of the drain pipe 4. The inverted U-shaped member 50 is secured between two lateral sides of the drain pipe 4.

Figure 4:
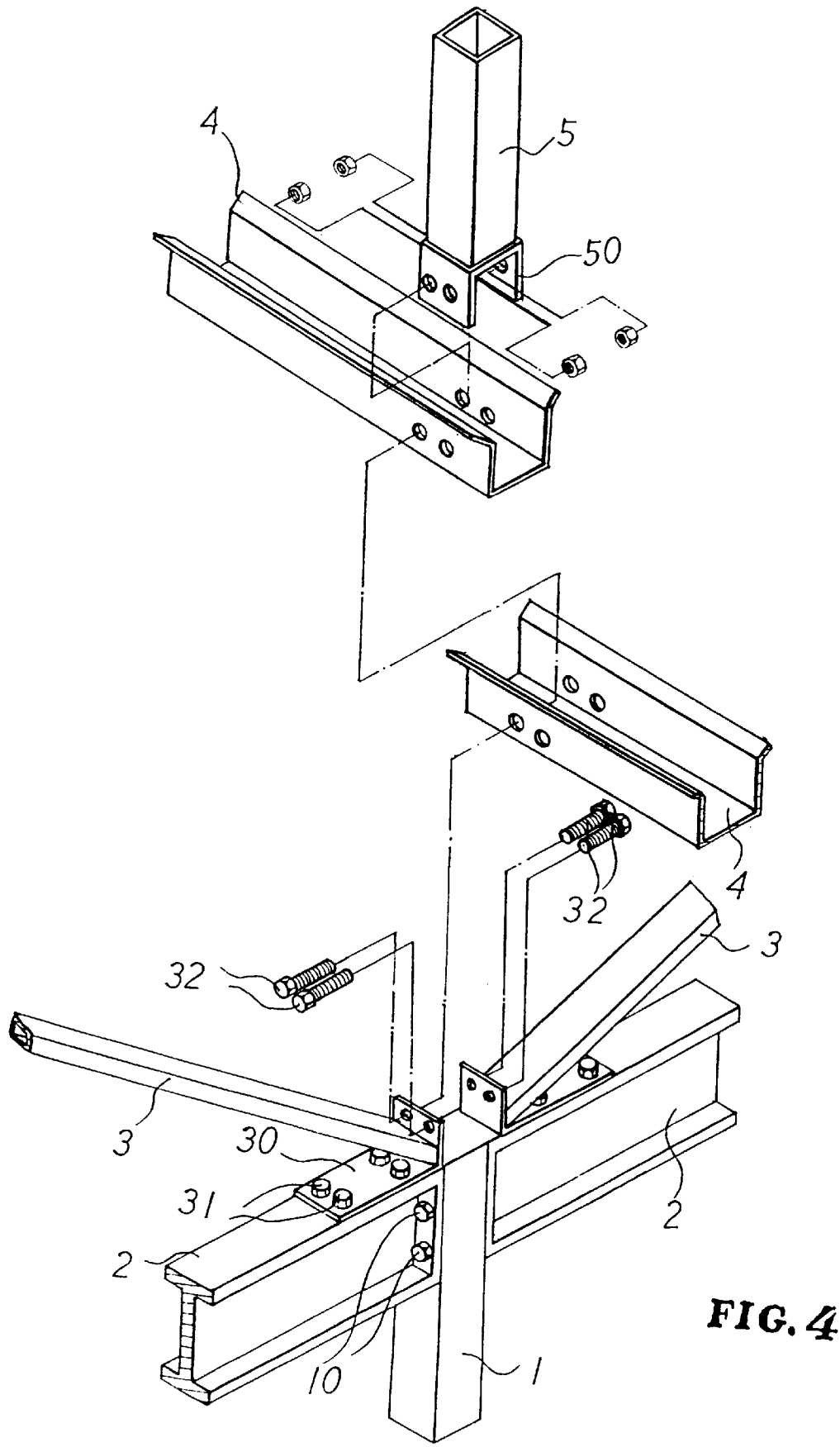
FIG. 4 is an exploded view of a second preferred embodiment according to the present invention.
Figure 5:
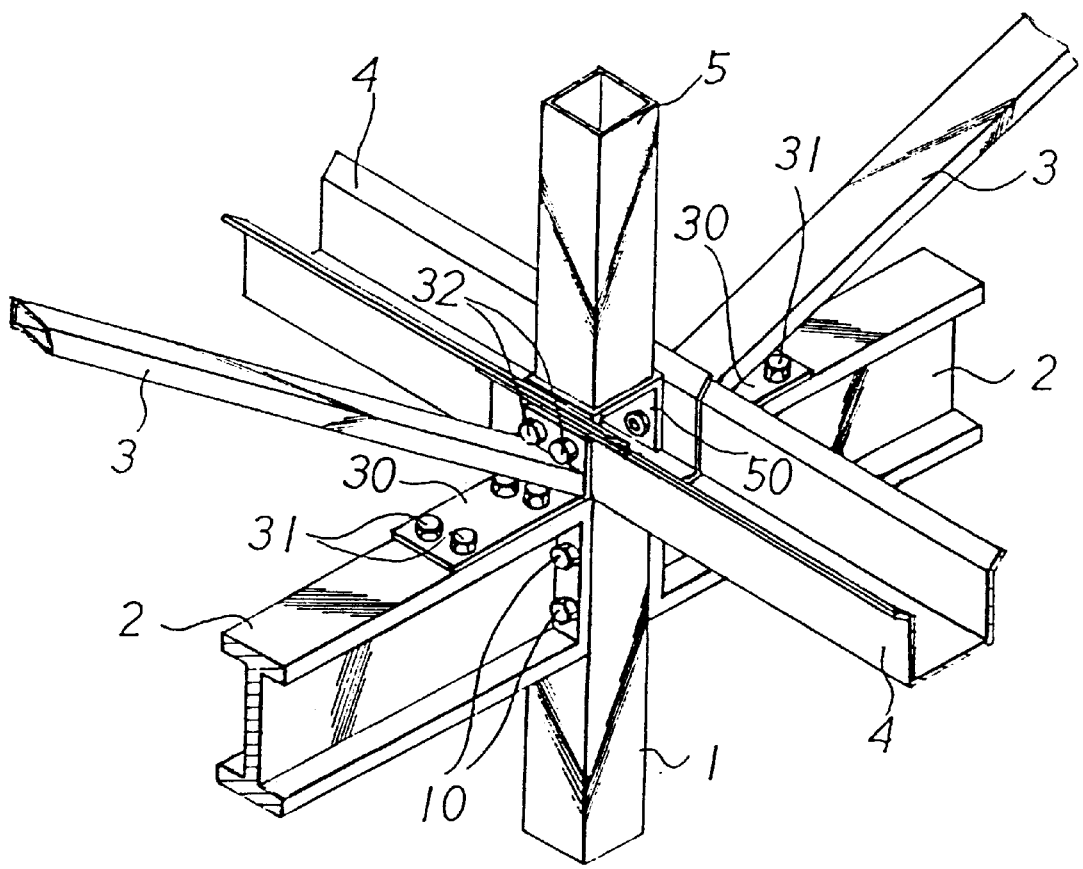
FIG. 5 is a perspective view of the second preferred embodiment according to the present invention.
Figure 6:
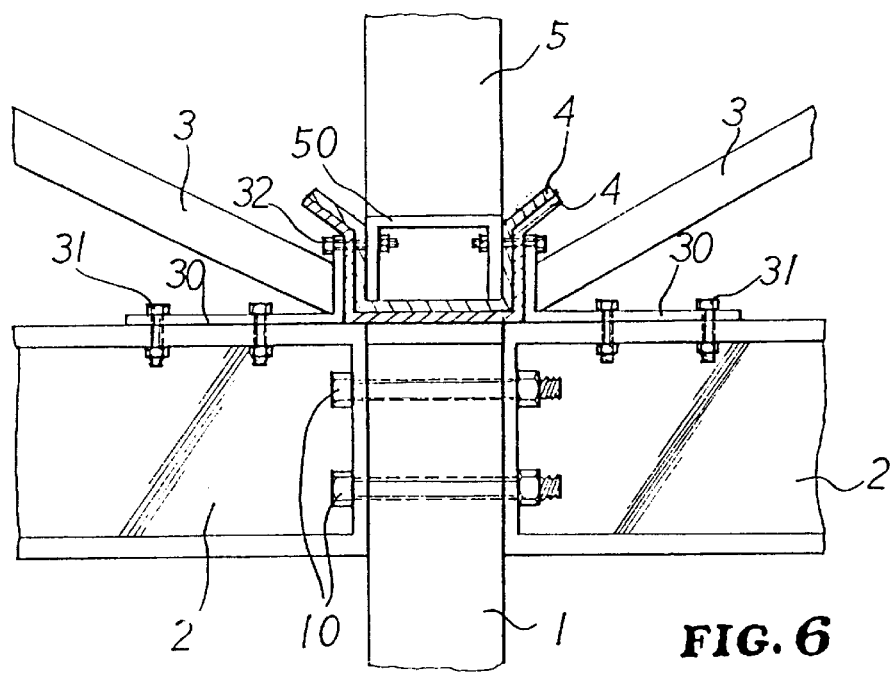
FIG. 6 is a sectional view of the second preferred embodiment according to the present invention.

Turning to FIGS. 4, 5 and 6, two drain pipes 4 are joined together by overlapping an end of a drain pipe 4 and an end of another drain pipe 4 and then fixedly securing the two drain pipes between the vertical portions of the two L-shaped fixing members 30 by the bolts 32. Thereafter, the drain pipes 4 are applied with water-proof treatment.

Figure 7:
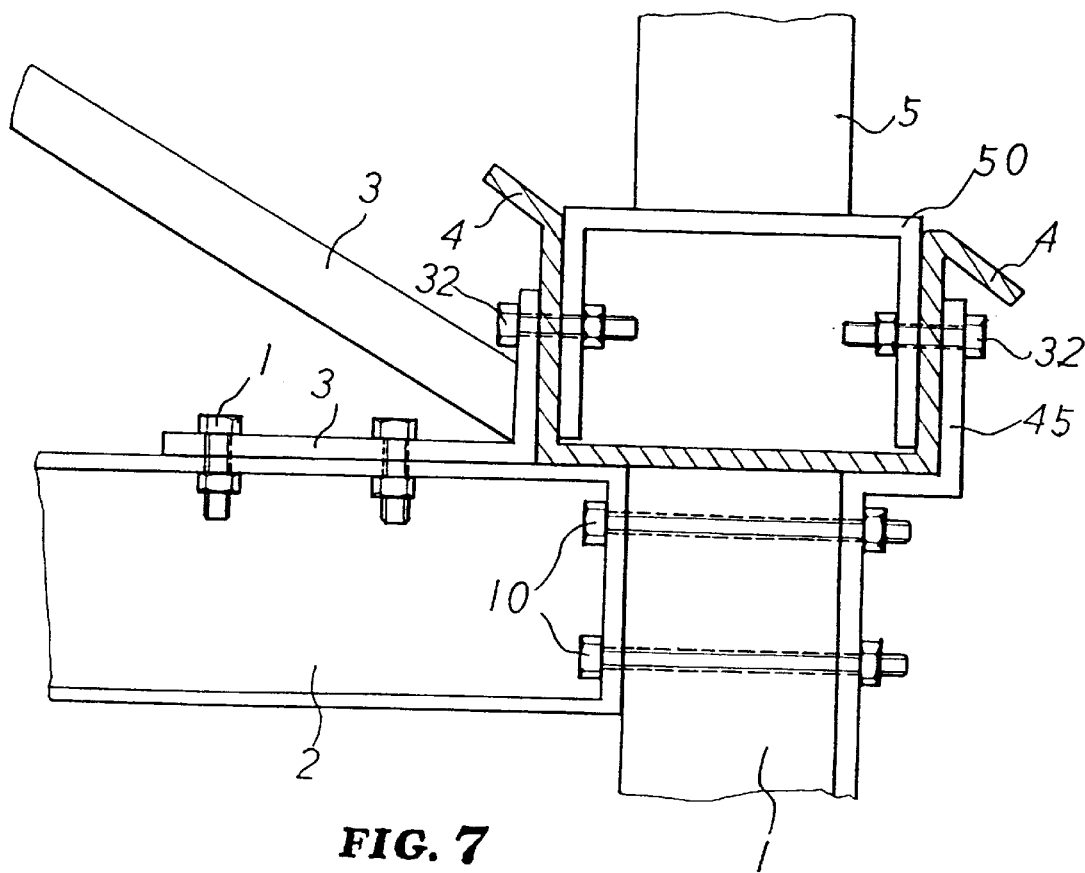
FIG. 7 is a sectional view of a third preferred embodiment according to the present invention.

As shown in FIG. 7, the outer side of the drain pipe 4 at the outermost post 5 is bent down to form a flange for covering the fixing plate 45 thereby preventing water to enter into the greenhouse (not shown).

From the above, the L-shaped fixing member 30 joined to the lower end of the bracing strut 3 by welding is not only designed for fastening the bracing strut 3 on the beam 2, but also for securing the drain pipe 4 and the post 5 in fixed positions and connecting drain pipes 4 together, thereby facilitating the construction of a greenhouse.

Furthermore, the component parts, i.e. the post 1, the beam 2, the bracing strut 3, the L-shaped fixing member 30, the drain pipe 4, the vertical rod 5 and the inverted U-shaped member 50, can be made from standard material as a uniform specification in advance, so that it is unnecessary to perform secondary processing thereby making it easier to build a greenhouse.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A skeleton of a greenhouse comprising:
   a plurality of equidistant posts;
   a plurality of beams each fixedly mounted between every two of said posts;
   a plurality of bracing struts each having a lower end welded with an L-shaped fixing member, said L-shaped fixing member having a horizontal portion fastened on a respective one of said beams by bolts;
   a plurality of drain pipes each fixedly mounted between every two of said L-shaped fixing members; and
   a plurality of vertical rods each having a lower end welded with an inverted U-shaped member fitted with a respective one of said drain pipes and fixed in place by said bolts.

2. The skeleton of a greenhouse as claimed in claim 1, wherein said drain pipes are connected together by overlapping end portions thereof.

3. The skeleton of a greenhouse as claimed in claim 1, wherein an outer side of said drain pipe at an outermost one of said posts is bent down to form a flange for preventing water to enter into said greenhouse.

* * * * *